(12) United States Patent
Gaubatz et al.

(10) Patent No.: US 9,984,318 B2
(45) Date of Patent: May 29, 2018

(54) DATA-BEARING MEDIUM

(71) Applicant: Hewlett-Packard Development Company, L.P., Fort Collins, CO (US)

(72) Inventors: Matthew D Gaubatz, Seattle, WA (US); Robert Ulichney, Stow, MA (US); Steven J Simske, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 14/917,547

(22) PCT Filed: Sep. 20, 2013

(86) PCT No.: PCT/US2013/060960
§ 371 (c)(1),
(2) Date: Mar. 8, 2016

(87) PCT Pub. No.: WO2015/041684
PCT Pub. Date: Mar. 26, 2015

(65) Prior Publication Data
US 2016/0217358 A1 Jul. 28, 2016

(51) Int. Cl.
| G06K 19/00 | (2006.01) |
| G06K 19/06 | (2006.01) |
| G06F 3/00 | (2006.01) |
| H04N 1/32 | (2006.01) |
| H04N 1/405 | (2006.01) |
| G11B 20/14 | (2006.01) |

(52) U.S. Cl.
CPC ......... *G06K 19/06037* (2013.01); *G06F 3/00* (2013.01); *G06K 19/06103* (2013.01); *G11B 20/14* (2013.01); *H04N 1/32144* (2013.01); *H04N 1/32288* (2013.01); *H04N 1/32293* (2013.01); *H04N 1/32304* (2013.01); *H04N 1/4051* (2013.01); *H04N 1/4055* (2013.01); *H04N 1/32256* (2013.01)

(58) Field of Classification Search
USPC ....... 235/435, 439, 451, 454, 462, 487, 492, 235/493, 494
See application file for complete search history.

(56) References Cited

U.S. PATENT DOCUMENTS

| 5,095,484 A | * | 3/1992 | Karabed | ......... G11B 20/10009 341/58 |
| 6,484,933 B1 | * | 11/2002 | Zimmerman | .......... G06K 1/121 235/375 |
| 7,181,042 B2 | | 2/2007 | Tian | |
| 2005/0001042 A1 | | 1/2005 | Lapstun | |

(Continued)

FOREIGN PATENT DOCUMENTS

| EP | 1268427 A1 | 2/2006 |
| WO | 20140120138 A1 | 8/2014 |

*Primary Examiner* — Matthew Mikels
(74) *Attorney, Agent, or Firm* — HP Inc. Patent Department

(57) ABSTRACT

An example method for forming a data-bearing medium in accordance with aspects of the present disclosure includes setting variables associated with the data-bearing medium, the variables comprising a bit length of a codeword, identifying a phase-invariant codeword based on the variables, and arranging rows of the data-bearing medium with the phase-invariant codewords.

19 Claims, 14 Drawing Sheets

(56) References Cited

U.S. PATENT DOCUMENTS

| | | |
|---|---|---|
| 2010/0077176 A1* | 3/2010 | Pearlstein ............... G06F 7/785 |
| | | 712/22 |
| 2010/0134278 A1 | 6/2010 | Srinivasan et al. |
| 2011/0050990 A1 | 3/2011 | Farkash |
| 2011/0069328 A1* | 3/2011 | Ulichney ............. H04N 1/4055 |
| | | 358/1.9 |
| 2011/0211695 A1 | 9/2011 | Westerveld |
| 2012/0070030 A1 | 3/2012 | Ulichney |
| 2012/0281920 A1 | 11/2012 | Ulichney |
| 2013/0044948 A1 | 2/2013 | Gaubatz |

* cited by examiner

| Shift | $b_3$ | $b_2$ | $b_1$ | $b_0$ | Decimal Value |
|---|---|---|---|---|---|
| 0 | 1 | 1 | 0 | 0 | 12 |
| 1 | 0 | 1 | 1 | 0 | 6 |
| 2 | 0 | 0 | 1 | 1 | 3 |
| 3 | 1 | 0 | 0 | 1 | 9 |

Fig. 2A

| Shift | $b_3$ | $b_2$ | $b_1$ | $b_0$ | Decimal Value |
|---|---|---|---|---|---|
| 0 | 1 | 0 | 1 | 0 | 10 |
| 1 | 0 | 1 | 0 | 1 | 5 |
| 2 | 1 | 0 | 1 | 0 | 10 |
| 3 | 0 | 1 | 0 | 1 | 5 |

Fig. 2B

| Shift | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ | Decimal Value |
|---|---|---|---|---|---|---|---|---|---|---|---|---|---|---|---|---|---|
| 0 | 1 | 0 | 1 | 1 | 0 | 0 | 1 | 0 | 0 | 0 | 0 | 0 | 1 | 0 | 1 | 0 | 45578 |
| 1 | 0 | 1 | 0 | 1 | 1 | 0 | 0 | 1 | 0 | 0 | 0 | 0 | 0 | 1 | 0 | 1 | 22789 |
| 2 | 1 | 0 | 1 | 0 | 1 | 1 | 0 | 0 | 1 | 0 | 0 | 0 | 0 | 0 | 1 | 0 | 44162 |
| 3 | 0 | 1 | 0 | 1 | 0 | 1 | 1 | 0 | 0 | 1 | 0 | 0 | 0 | 0 | 0 | 1 | 22081 |
| 4 | 1 | 0 | 1 | 0 | 1 | 0 | 1 | 1 | 0 | 0 | 1 | 0 | 0 | 0 | 0 | 0 | 43808 |
| 5 | 0 | 1 | 0 | 1 | 0 | 1 | 0 | 1 | 1 | 0 | 0 | 1 | 0 | 0 | 0 | 0 | 21904 |
| 6 | 0 | 0 | 1 | 0 | 1 | 0 | 1 | 0 | 1 | 1 | 0 | 0 | 1 | 0 | 0 | 0 | 10952 |
| 7 | 0 | 0 | 0 | 1 | 0 | 1 | 0 | 1 | 0 | 1 | 1 | 0 | 0 | 1 | 0 | 0 | 5476 |
| 8 | 0 | 0 | 0 | 0 | 1 | 0 | 1 | 0 | 1 | 0 | 1 | 1 | 0 | 0 | 1 | 0 | 2738 |
| 9 | 0 | 0 | 0 | 0 | 0 | 1 | 0 | 1 | 0 | 1 | 0 | 1 | 1 | 0 | 0 | 1 | 1369 |
| 10 | 1 | 0 | 0 | 0 | 0 | 0 | 1 | 0 | 1 | 0 | 1 | 0 | 1 | 1 | 0 | 0 | 33452 |
| 11 | 0 | 1 | 0 | 0 | 0 | 0 | 0 | 1 | 0 | 1 | 0 | 1 | 0 | 1 | 1 | 0 | 16726 |
| 12 | 0 | 0 | 1 | 0 | 0 | 0 | 0 | 0 | 1 | 0 | 1 | 0 | 1 | 0 | 1 | 1 | 8363 |
| 13 | 1 | 0 | 0 | 1 | 0 | 0 | 0 | 0 | 0 | 1 | 0 | 1 | 0 | 1 | 0 | 1 | 36949 |
| 14 | 1 | 1 | 0 | 0 | 1 | 0 | 0 | 0 | 0 | 0 | 1 | 0 | 1 | 0 | 1 | 0 | 51242 |
| 15 | 0 | 1 | 1 | 0 | 0 | 1 | 0 | 0 | 0 | 0 | 0 | 1 | 0 | 1 | 0 | 1 | 25821 |

| B = code length | $Q_B$ = number of unique length-B phase-invariant codewords | $Log_2(Q_B)$ | Phase-invariant LUT size |
|---|---|---|---|
| 1 | 2 | 1.00 | 2 bytes |
| 2 | 3 | 1.59 | 3 bytes |
| 3 | 4 | 2.00 | 4 bytes |
| 4 | 6 | 2.59 | 6 bytes |
| 5 | 8 | 3.00 | 8 bytes |
| 6 | 14 | 3.81 | 14 bytes |
| 7 | 20 | 4.32 | 20 bytes |
| 8 | 36 | 5.17 | 36 bytes |
| 9 | 60 | 5.91 | 120 bytes |
| 10 | 108 | 6.76 | 216 bytes |
| 11 | 188 | 7.56 | 376 bytes |
| 12 | 352 | 8.46 | 704 bytes |
| 13 | 632 | 9.30 | 1.26 kB |
| 14 | 1182 | 10.21 | 2.36 kB |
| 15 | 2192 | 11.10 | 4.38 kB |
| 16 | 4116 | 12.01 | 8.23 kB |
| 17 | 7712 | 12.91 | 23.1 kB |
| 18 | 14602 | 13.83 | 43.8 kB |
| 19 | 27596 | 14.75 | 82.8 kB |
| 20 | 52488 | 15.68 | 157 kB |
| 21 | 99880 | 16.61 | 300 kB |
| 22 | 190746 | 17.54 | 572 kB |
| 23 | 364724 | 18.48 | 1.09 MB |
| 24 | 699252 | 19.42 | 2.10 MB |
| 25 | 1342184 | 20.37 | 5.37 MB |
| 26 | 2581428 | 21.30 | 10.3 MB |
| 27 | 4971068 | 22.25 | 19.9 MB |
| 28 | 9587608 | 23.19 | 38.4 MB |
| 29 | 18512820 | 24.14 | 74.1 MB |
| 30 | 35792654 | 25.09 | 143 MB |

Fig. 6

DATA-BEARING MEDIUM

BACKGROUND

Technologies for enabling data-bearing hard copy afford a number of interesting applications, including labels, packaging, signage, and documents in general. Non-limiting examples of data-bearing media may include data-bearing magnetic media (e.g., magnetic storage), data-bearing optical media (e.g., optical storage), data-bearing atomic media (e.g., atomic storage), data-bearing images, etc. For example, data-bearing images may include data-bearing halftoned images (e.g., halftoned images in which explicit data is added by altering the halftone structure in a controlled/causal way), graphical alpha-numerics, barcodes, etc.

One approach of enabling data bearing properties may be encoding information in a recoverable (readable) manner in the halftone of an image. Halftone screening techniques represent one of the methods imaging companies have used to improve the quality of printed pieces. These techniques can possibly improve the aesthetic qualities and fidelity of printed reproductions. Clustered-dot halftoning converts the original image into a series of dots of varying size to simulate tonal difference, displaying detail in the image. Darker areas of the image are printed with larger dots and lighter areas are printed with smaller dots. These different sized dots absorb the light reflecting from the paper in varying amounts thus giving the illusion of different shades of gray while printing with black ink.

BRIEF DESCRIPTION OF THE DRAWINGS

Example implementations are described in the following detailed description and in reference to the drawings, in which:

FIG. 2A illustrates a table of an example of the right circular shifts of a string of data in accordance with an implementation;

FIG. 2B illustrates a table of an example of the right circular shifts of another string of data;

FIG. 3 illustrates a table of an example of the right circular shifts of another string of data in accordance with an implementation;

FIG. 4 illustrates an example of a two-dimensional array of data bits;

FIG. 6 illustrates an example of a table of number of unique codewords as a function of code length;

DETAILED DESCRIPTION

Figure 1:
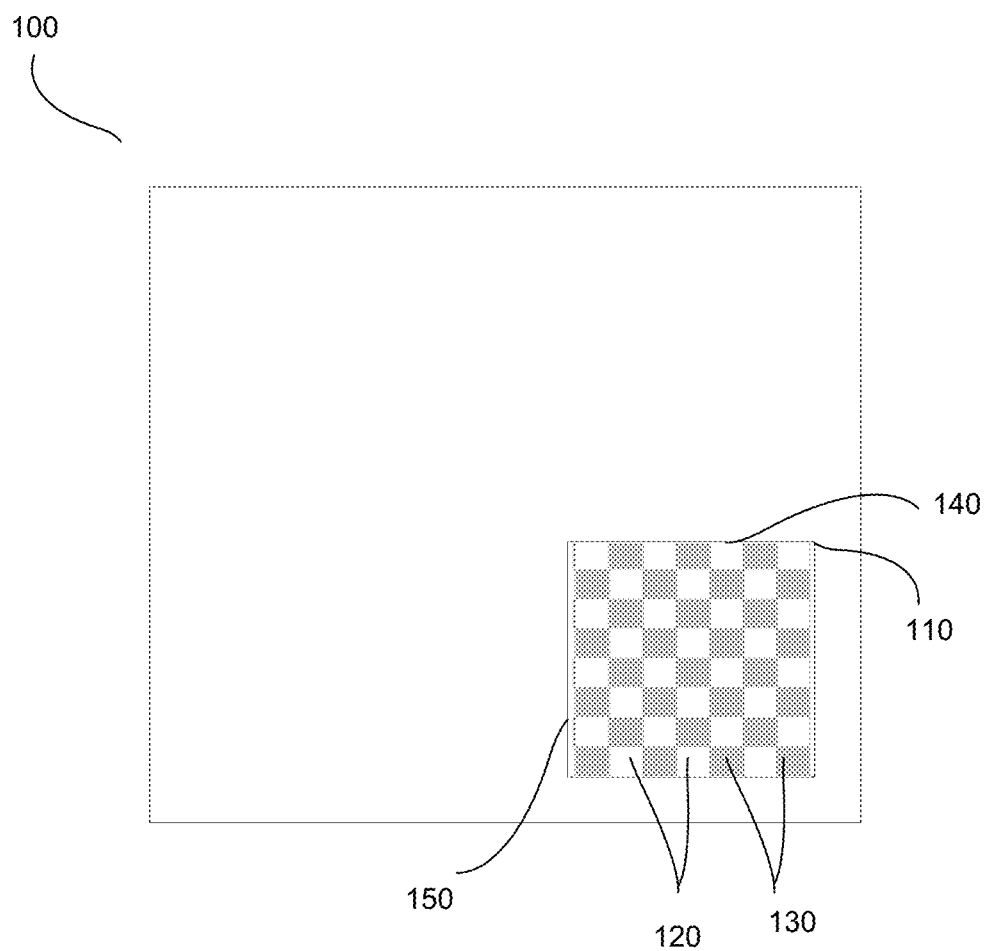
FIG. 1 illustrates an example data-bearing medium in accordance with an implementation.

Various implementations described herein are directed to producing a high quality image with an encoded message. More specifically, and as described in greater detail below, various aspects of the present disclosure are directed to a manner by which a set of processes are implemented to encode a message throughout an image that can be recovered when a subset or window of that image is examined. The can be accomplished without loss of halftone quality.

Aspects of the present disclosure described herein implement a comprehensive and integrated tool that allows recovering data from some data-bearing media. According to various aspects of the present disclosure, the approach described herein allows a user to view information without having to capture an entire array of data-bearing elements, such as an entire data-bearing medium. Accordingly, the approach described herein allows the use of capture devices having fields of view that are smaller than an entire data-bearing medium, meaning that a portion of the data-bearing medium can be captured.

Moreover, aspects of the present disclosure described herein also disclose a structured array of data-bearing elements of a data-bearing medium representing an array of bits, wherein a certain number of the bits in the array of bits repeats and where positions of the bits in each line (e.g., rows or columns) of the array of bits are circularly shifted from positions of the bits in an immediately preceding line. More specifically, in one implementation, the row-to-row shift is fixed. In another implementation, the row-to-row shift is arbitrary, i.e., per-row shifts may bear no particular relationship with one another. Among other things, this approach allows a portion of the data-bearing medium to include at least a shifted version of a set of bits representing a message, i.e., the codeword without synchronizing codewords, i.e., locate the start or end of any subsequence of bits, in order to interpret the data in any given window from the portion of the data-bearing medium. Accordingly, this approach advantageously allows a message, i.e., a payload to be recovered from a portion of the data-bearing medium without capturing the entire data-bearing medium. Such aspects, among other things, increase the simplicity of the operation, offering a fast solution. Further, this approach allows processing a message that may be large in size and finding the smallest dimensions of the data-bearing medium in which the complete message can be encoded.

In one example in accordance with the present disclosure, a method for forming a data-bearing medium is provided. The method comprises setting variables associated with the data-bearing medium, the variables comprising a bit length of a codeword and a set of row-to-row offsets, identifying a phase-invariant codeword, and arranging rows of the data-bearing medium with the standard form of the phase-invariant codewords. In another example, the table includes the standard form of each phase-invariant codeword, the standard forms being circularly shifted versions of each of the codewords.

In another example in accordance with the present disclosure, a method for recovering a payload from a data-bearing medium is provided. The method comprises decoding data-bearing elements in the data-bearing medium into an array of bits, calculating an average value for each bit in the array of bits, establishing a phase-invariant codeword based on the average values, mapping the phase-invariant codeword to a standard form of the phase-invariant codeword, locating an entry in a table corresponding to the standard form of the phase-invariant codeword, and returning the message based on the entry.

In a further example in accordance with the present disclosure, a data-bearing medium is provided. The data-bearing medium comprises an array of data-bearing elements, wherein the array of data-bearing elements represents an array of bits, wherein phase-invariant codewords are identified using a table generated based on variables associated with the data-bearing medium, the variables comprising a set of row-to-row offset, wherein rows of the array of bits are arranged with phase-invariant codewords, and wherein positions of the bits in each row of the array of bits are circularly shifted from positions of the bits in an immediately preceding row based on each row-to-row offset. In another example, the variables comprise a bit length of a codeword in addition to the set of row-to-row offsets. In yet another example, the table includes the standard form of each phase-invariant codeword.

FIG. 1 illustrates a data-bearing medium 100, such as a data-bearing optical, magnetic, or atomic medium or a data-bearing image in accordance with an implementation. The data-bearing medium 100 may comprise an image with highlight areas and shadow areas, and data may be carried on black clusters in highlight areas of the image, and on white clusters in the shadow areas. It should be readily apparent that the data-bearing medium 100 represents a generalized depiction and that the medium may be modified or rearranged without departing from a scope of the present disclosure.

In one implementation, data (e.g., that may be referred to as a payload) may be encoded in an array of data-bearing elements in the data-bearing medium 100 that can be read by a data recovery system. The data-bearing medium 100 may comprise data-bearing halftones, graphical alpha-numerics, barcodes or other examples of data-bearing images, where the data-bearing elements may be symbols that encode the payload. In an example, the payload may be in the form of a string of bits (e.g., a bit code), such as ones and zeros. Each bit in the string may be encoded in one data-bearing element of the data-bearing medium (e.g., encoded in one symbol in a data-bearing image). Further, the data-bearing medium 100 such as data-bearing halftone images may be used to encode a codeword P in an original grayscale image (e.g., a source image), such as a photograph, graphic, text, or an area, such as the background of a page.

In another implementation, the codeword may be repeated throughout the data-bearing medium 100. The repeating codeword may have a certain number of bits (B). One bit may be assigned to every cell in the image, and each cell may be data-bearing or non-data-bearing. For each line of cells in the image, the codeword may be repeated until the end of the line. In one implementation, the codeword string of bits may be encoded using a string of bits formed by circularly shifting (e.g., by right circularly shifting) the bit positions of the bits in codeword string of bits.

The codeword may be recovered from a region 110 that is a portion (e.g., a subset), such as a crop, of data-bearing medium 100, e.g., without any knowledge of the dimensions, overall content, etc. of the original image. In one implementation, the region 110 may be an example of a segmentation of a certain size (e.g., 23×23) cell area in a classical halftone screen that may represent the area of the captured window of the encoded image. In one example, the region 110 may be the size of an image-capture area of an image-capturing device, such as a CID (charge injection device) camera, used by a codeword recovery system that can be used to recover the codeword from the data-bearing medium 100. Alternatively, the size of the region 110 may be equal to or greater than the image of the data-bearing medium 100.

The region 110 may include highlight modules (e.g., highlight cells) 130 and shadow cells 120. For example, each cell in the region 110 may correspond to a data-bearing element, such as a data-bearing symbol, e.g., that may encode one bit. The highlight cells 130 may be represented by gray squares and shadow cells 120 may be represented by white cells. In light image areas, the shadow cells 120 may be completely white and thus unable to carry any data, while the highlight cells 130 may be rendered as small black clusters capable of carrying data. In dark image areas, the highlight cells 130 may be completely black while the shadow cells 120 rendered as small white clusters can carry data. It should be readily apparent that while the captured window 110 cells are displayed as a checkerboard (e.g., the shadow cells 120 and highlight cells 130), the rest of the data-bearing medium 100 illustrated in FIG. 1 includes cells across the entire image, and the captured region 110 cells has been shown and described for simplicity.

In one implementation, the region 110 may have a 23×23 cell area of length (L) 23 of 150 symbols long and a width (W) 23 of 140 symbols wide. In light portions of a data-bearing halftone image, the shadow cells 120 may be completely white and thus unable to carry any data, while the highlight cells 130 may be rendered as small black clusters capable of carrying data by means of shifting, for example. In dark areas of a data-bearing halftone image, the highlight cells 130 may completely black and unable to carry any data, while the shadow cells 120 may be rendered as small white clusters that can carry data, for example.

FIG. 2A illustrates an example implementation of how a codeword string of bits P=1100 (e.g. where B=4) may be right circularly shifted, where the "shift" is the number of bit positions by which the bits in the codeword are right circularly rotated. FIG. 2A provides each shifted version of the codeword. It should be noted that the bit positions $b_3$ to $b_0$ respectively, denote the most to the least significant bit positions in FIG. 2A, where bit position $b_3$ is the most significant bit position in FIG. 2A and bit position $b_0$ is the least significant bit position in FIG. 2A. In an example, the string of bits 1100 may be an encrypted version of a message.

For each right circular shift of one bit, each bit may be moved one bit position to the right, and the bit in the last position on the right (e.g., in the rightmost position) may be moved to the first position (e.g., the leftmost position). For a shift of two, the bits 10 respectively in the positions $b_2$ and $b_1$ in the codeword 1100 are respectively moved to the bit positions $b_0$ and $b_3$. For each successive line, the codeword may be circularly shifted relative to the row above it. In one implementation, the line may refer to row-wise strings. In another implementation, the line may refer to column-wise strings.

In one implementation, the codeword string of bits may be mapped back to a message, i.e., decoded using the shifted version of the codeword having the lowest decimal value of all possible shifts of the payload string of bits. For example, the shifted version of the payload having the lowest decimal value of all possible shifts of the payload string of bits may be referred to as the standard form (e.g., standard phase) S of the payload. Therefore, for the example of FIG. 2A, the payload P=1100 may be decoded using the shifted version S=0011, corresponding to a right circular shift of two bit positions. As shown in FIG. 2A, each shift causes the bit value in every bit position to change, and therefore each shifted bit string may have a different decimal value in FIG. 2A. Further, each shifted bit string has B=4 bits of codeword, where the value B known to both encoder and decoder in FIG. 2A. In one implementation, the shifted versions of some codewords may have the same value. A codeword P=1010 is one such example, as is shown in FIG. 2B. The standard form S=0101 may be achieved with a right circular shift of 1 or 3. It should be noted that the number of independent strings that can be represented by B bits is less than 2 to the power B (where B>1).

FIG. 3 illustrates an example of the right circular shifts of a 16-bit codeword (e.g., for a codeword having B=16 bits) and the decimal value for each shift. The bit string 0000010101011001 is the standard form (S) of the codeword (P) bit string 1011001000001010. The bit positions b15 to b0, respectively, denote the most to the least significant bit positions in FIG. 3, where bit position b15 is the most significant bit position and bit position b0 is the least significant bit position. The shifted version of the codeword, e.g., the standard form S=0011 from FIG. 2 or the standard form S=0000010101011001 from FIG. 3, may be repeated in a two-dimensional array of bits, and the bits in each successive row of the two-dimensional array of bits may be right circularly shifted from the bits in an immediately preceding row by a right circular shift that is an integer multiple of the right circular shift (e.g., a right circular shift of two bit positions for the example of FIG. 2 or a right circular shift of nine bit positions for the example of FIG. 3) that produced the shifted version of the codeword.

Figure 4:
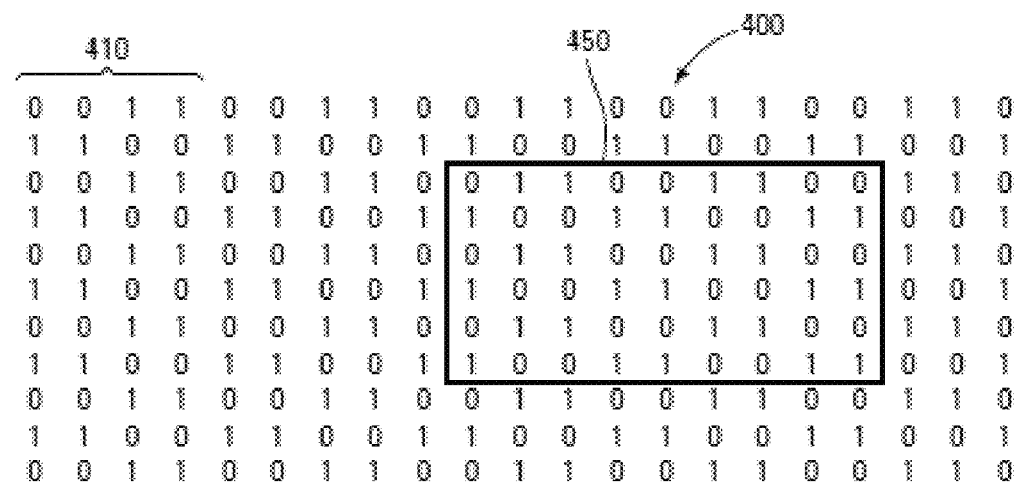

FIG. 4 illustrates an example a two-dimensional array 400 of data bits in accordance with an implementation. The string 410 (e.g., a certain number of the bits of the array 400) may be a unit string, for example, of bits 0011. The string 410 repeated throughout the array 400. The string 410 is a shifted version of the codeword 1100, and is obtained by right shifting the bits of codeword 1100 by two bit positions to the right, as discussed above in conjunction with FIG. 2. The string 410 is the standard form S=0011 of the codeword P=1100. It should be noted that the standard form has all of the bits of the codeword, but in different order.

Figure 5:
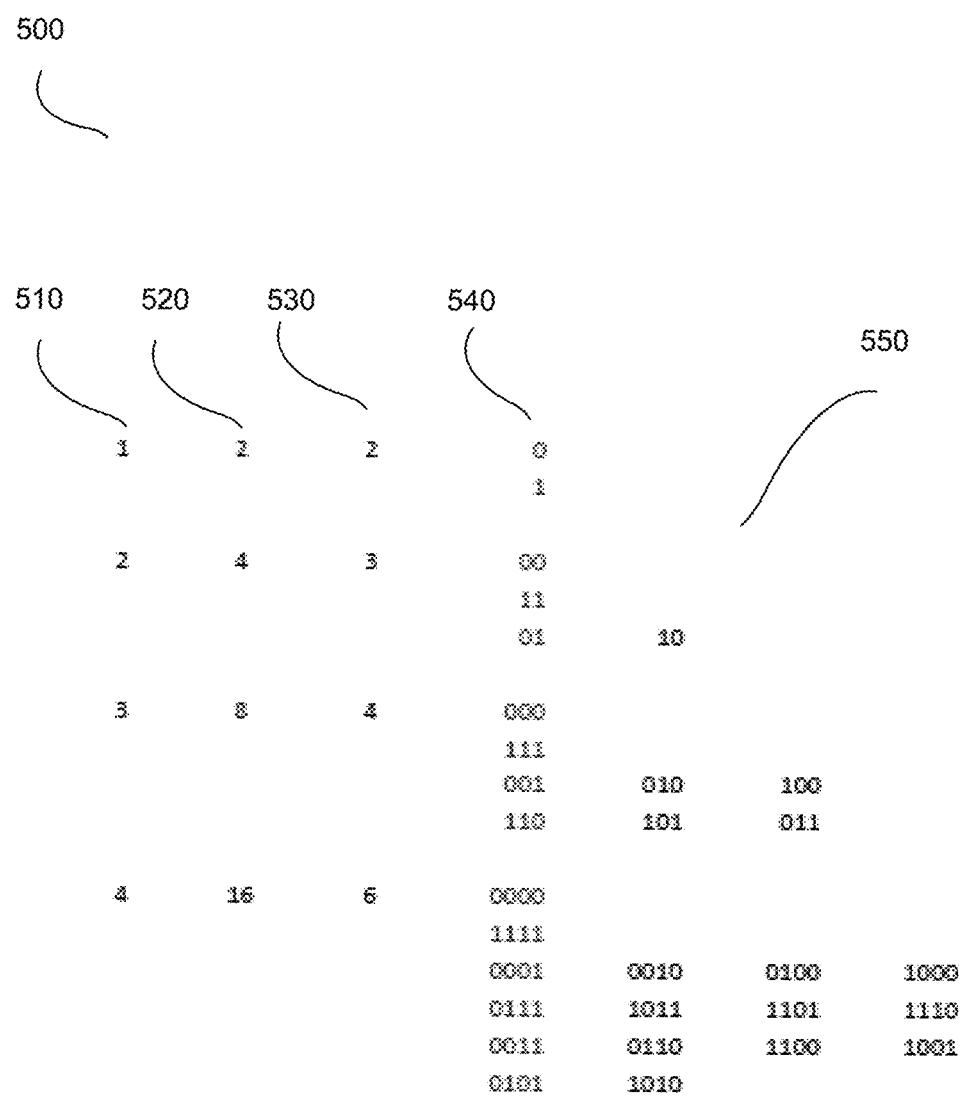
FIG. 5 illustrates an example of a table of lengths associated with phase-invariant sets of codewords.

FIG. 5 illustrates an example table 500 in accordance with one implementation. The table 500 shows all phase-invariant sets of codeword lengths 1 through 4. The table 500 comprises a bit length (B) 510, a number of phase-invariance codewords 520 of length B 510, a number of unique phase-invariant codewords 530 of length B 510, a list of the unique codewords 540, and circular versions 550 of the unique codewords 540.

In one implementation, a codeword (P) may consist of B bits in a two-dimensional array of one-bit symbols. The phase-invariant code 530 may represent natural numbers in some range $[1, 2^M]$ as sequences of B bits, where M represents the number of bits in a message to be represented in a two-dimensional array of one-bit symbols. All circular shifts of a given sequence may map to the same number, or index. For example, the following length-5 sequences would all be used to represent the same number: 10100, 01010, 00101, 10010, and 01001. Accordingly, if a code is repeated over and over in a stream of data, any length-B subsequence may be used to reconstruct the original number: 10100101001010010100101001010010100101001010010100101001-010010100 . . . .

In one implementation, per-row circular shifts (D) may be fixed. D may be the row-to-row offset of the codeword in the image (e.g., the row-to-row right circular shift in bit positions in a two-dimensional array of bits 400). Further, each row is circularly shifted by D more bit positions than the row above it regardless of codeword.

In another implementation, the phase-invariant codewords may comprise a code longer than the payload. In such implementation, the approach may allow information to be encoded in a manner so that a decoder can function without synchronizing, i.e., establish beginnings and endings of codewords in, the received stream. Any portion of the codewords containing a sufficient number of symbols may be mapped back to the original data. Further, the rows of the standard phase of the codeword are filled repeatedly, and with each codeword row circularly shifted by D more bits that the row above.

FIG. 6 illustrates an example mechanism 600 for mapping digital data to phase-invariant binary sequences in accordance with one implementation. The size of the lookup table 600 may be determined by the number of indices that can be represented by a phase-invariant set of codewords. The table 600 represents the number of unique phase-invariant codewords that can be represented with a B-bit sequence. In one implementation, binary data may be mapped to phase-invariant codewords using the integer part of the log based 2 of the number of unique codewords. Further, the phase-invariant look-up-table (LUT) size may be determined without composite codewords and computation. In another implementation, an alternative mechanism for mapping data to phase-invariant binary sequences may be used. In such situation, an iterative computation may be used instead of a lookup table.

In one example where the length-B code is a prime number, the number of unique codewords can be computed directly as a function of B. This number, $Q_B$, is given by:

$$Q_B = (2_B - 2)/B + 2$$

The number of data bits that can be represented using a set of $Q_B$:

$$\log_2(Q_B) = \log_2((2_B - 2)/B + 2) > \log_2(2B/B) = B - \log_2 B$$

Accordingly, a decoder may deduce the value of M from a transmitted value of B by:

$$M = [B - \log_2 B]$$

Figure 7:
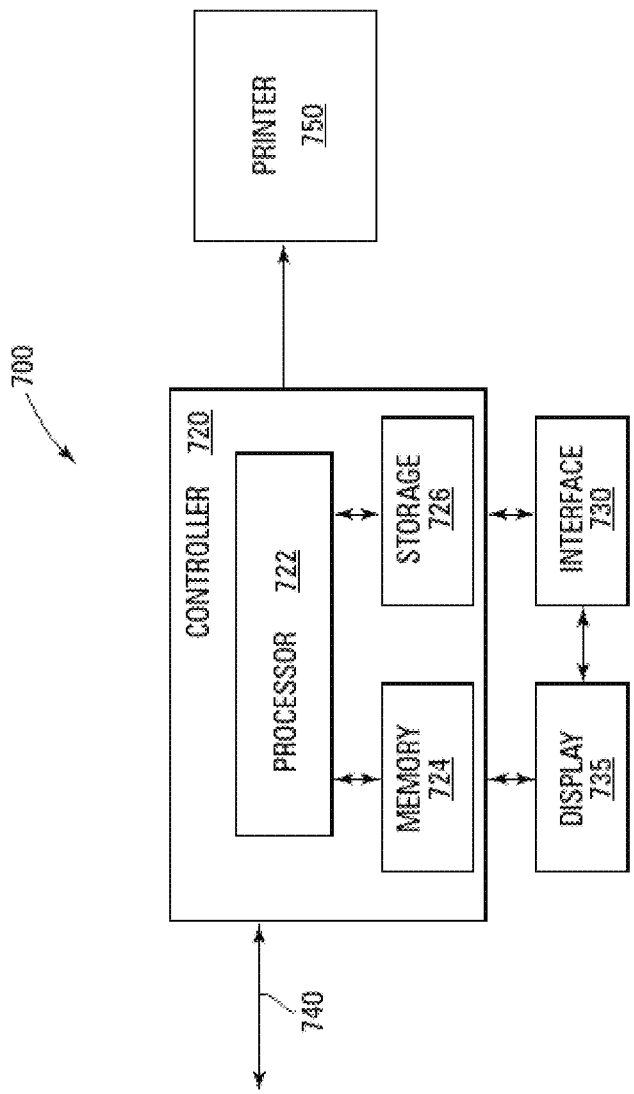
FIG. 7 illustrates a block diagram of an example of a data-bearing-medium-generation system.

FIG. 7 illustrates a block diagram of an example of a data-bearing-medium-generation system 700 that may generate data-bearing media, such as the data-bearing medium 100 in accordance with an implementation. For example, the data-bearing-medium-generation system 700 may generate the data-bearing medium disclosed herein. The system 700 may include a controller 720 that may allow the system 700 to perform the methods and functions disclosed herein for generating (e.g., automatically) the data-bearing media disclosed herein. In one implementation, one or more operations are performed by a device, such as the system 700, in response to an event without user intervention, and the one or more operations may be taken as being performed automatically.

The controller 720 may include a processor 722 for processing machine-readable instructions, such as processor-readable (e.g., computer-readable) instructions. The machine-readable instructions may configure the processor 722 to allow the controller 720 to allow the system 700 to perform the methods and functions associated with generating (e.g., automatically) the data-bearing media disclosed herein.

The machine-readable instructions may be stored in a memory 724, such as a non-transitory computer-usable medium, coupled to the processor 722 and may be in the form of software, firmware, hardware, or a combination thereof. In a hardware solution, the machine-readable instructions may be hard coded as part of the processor 722, e.g., an application-specific integrated circuit (ASIC) chip. In a software or firmware solution, the instructions may be stored for retrieval by the processor 722. Some additional examples of non-transitory computer-usable media may include static or dynamic random access memory (SRAM or DRAM), read-only memory (ROM), electrically erasable programmable ROM (EEPROM) memory, such as flash memory, magnetic media and optical media, whether permanent or removable, etc. Some consumer-oriented computer applications are software solutions provided to the user in the form of downloads, e.g., from the Internet, or removable computer-usable non-transitory media, such as a compact disc read-only memory (CD-ROM) or digital video disc (DVD).

The controller 720 may include a storage device 726, such as a hard drive, removable flash memory, etc. The storage device 726 may store digital image data (e.g., bitmaps, PDFs, TIFFs, JPEGs, etc.) corresponding to (e.g., representing) the data-bearing media disclosed herein. The storage device 726 may store encryption keys, such as PKI and IBE encryption keys to encrypt data to be encoded into the data-bearing media.

A human-machine interface 730 may be coupled to the controller 720. The interface 730 may be interface with a number of input devices, such as a keyboard and/or pointing device, including, for example, a mouse. The interface 730 may interface with a display 735 that may include a touchscreen that may function as an input device. The controller 720 may be coupled to a data network, such as the Internet, a Local Area Network (LAN), etc., and/or a computer via an interface 740. The system 700 may include a printer 750 coupled to the controller 720. The printer 750 may be used to print digital image data, corresponding to data-bearing media, as hard-copy images. The printer 750 may be replaced with apparatus for creating data-bearing elements on atomic data-bearing media, magnetic data-bearing media, optical data-bearing media, etc., for example.

The processor 722, memory 724, and storage 726 may be part of a computer, such as a personal computer, for example. As such, the machine-readable instructions may configure the processor 722 to allow a computer to create electronic versions of data-bearing media. For example, the computer may be coupled to a printer, such as the printer 750, that may print the electronic versions of data-bearing media as hardcopy images.

It should be recognized that the functionality of the various block components described with reference to FIG. 7 may not necessarily be segregated into distinct components or component portions of a data-bearing-media-generation system. For example, a single component or component portion of a data-bearing-media-generation system could be adapted to perform the functionality of more than one block component of FIG. 7. Alternatively, one or more components or component portions of a data-bearing-media-generation system could be combined to perform the functionality of a single block component of FIG. 7.

Figure 8:
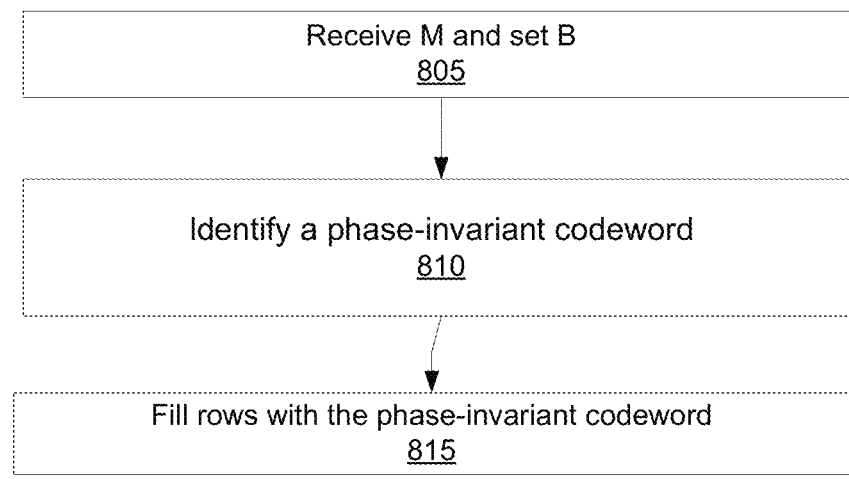
FIG. 8 illustrates a flowchart of an example of a method for forming a data-bearing medium.

Turning now to the operation of the data-bearing medium 100, FIG. 8 illustrates an example process flow diagram 800 in accordance with an implementation. The process 800 depicts an example of a data-bearing-medium-generation system 700 that may generate data-bearing media, such as the data-bearing medium 100. The machine-readable instructions may instruct the processor 722 to allow the data-bearing-media-generation system 700 to perform the process 800 as illustrated by the flowchart in FIG. 8. In one implementation, the data-bearing-medium-generation system 700 may perform the process 800 in response to receiving an instruction from a user to form a data-bearing medium.

The process 800 may begin at block 805, where an instruction, e.g., from a user is received to form a data-bearing medium. In particular, this process may involve setting the bit length (B) of the codeword. In one implementation, a set of row-to-row offsets and a mechanism for shifting each row may also be set. In another implementation, the row-to-row offsets are all identical and are given a parameter (D). In another implementation, the codeword bit length may be odd, and the row-to-row offset may be even.

At block 810, the controller 720 maps an M-bit message to the B-bit shift invariant code. In particular, this process may involve using a lookup table. In one implementation, the value of the M-bit message may act as an index into the table, which may be used to retrieve a shift-invariant codeword, possibly in standard form S. In particular, the standard form corresponds to the shifted bit sequence of the codeword that yields the smallest value. In one implementation, the string of bits may be an encrypted version of a message that is encrypted by the controller 720. For example, the controller 720 may receive a message and encrypt the message.

At block 815, the controller 720 repeatedly fills rows with a phase-invariant codeword, with each row containing circularly shifted versions of a repeating version of the B-bit codeword. In one implementation, each row may be circularly shifted by the row-to-row offset (D) more bits that the row above. In particular, this process may involve arranging the two-dimensional array of bits so that the bits in each successive row of the two-dimensional array of bits are circularly shifted (e.g., right circularly shifted) from the bits in an immediately preceding row. In another implementation, the row contents are defined by shifted versions of the standard form S.

Figure 9:
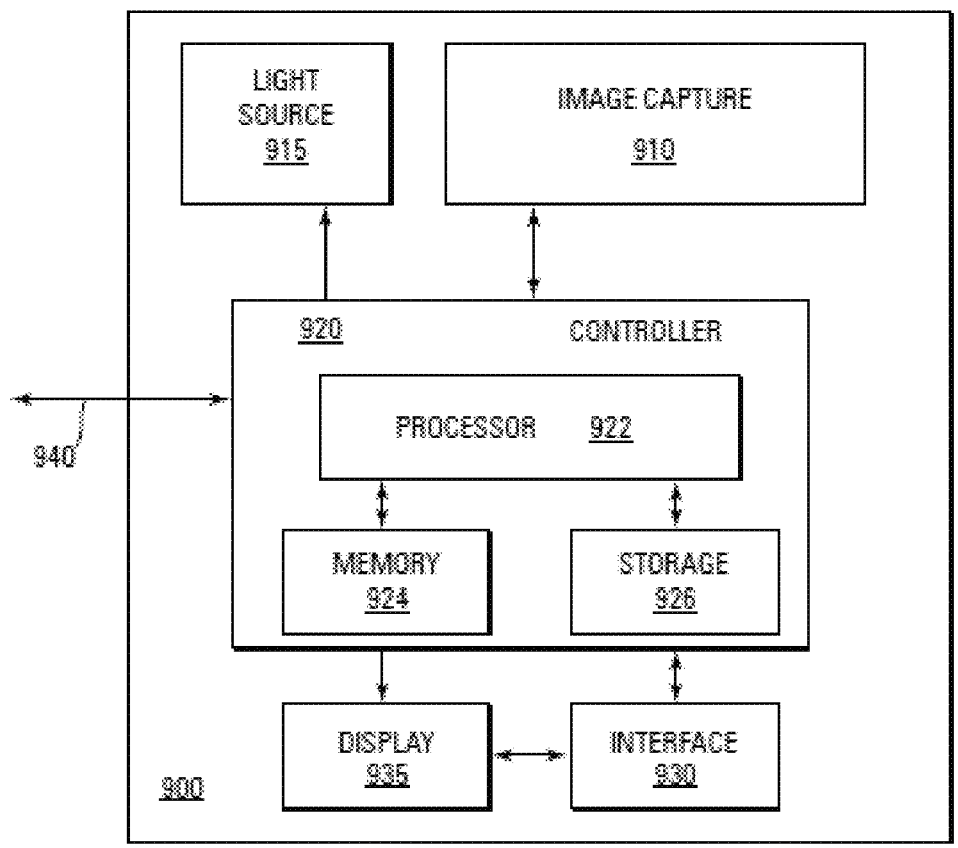
FIG. 9 illustrates a block diagram of an example of a data-recovery system.

FIG. 9 illustrates a block diagram of an example of a data-recovery system 900 (e.g., a data-bearing-medium reader) to recover data, e.g., a payload, from a data-bearing medium, such as the data-bearing medium 100. For instance, the data-recovery system 900 may recover data from the examples of the data-bearing media disclosed herein, such as data-bearing halftones. The system 900 may be a mobile (e.g., handheld) device that may be moved relative to a stationary data-bearing medium or a stationary or fixed-position device that remains stationary or fixed while a data-bearing medium is moved past it.

The system 900 may capture a portion of a data-bearing medium, such as the region (e.g., cropped region) 110 that is a portion (e.g., a crop) of the data-bearing medium 100 in FIG. 1. The number of data-bearing elements in a cropped region of a data-bearing medium (e.g., the region 110) is L×W, where L is the number of data-bearing elements in the crop in the column (e.g., vertical) direction of the crop and W is the number of data-bearing elements in the crop in the row (e.g., horizontal) direction of the crop.

The system 900 may include a data-bearing-media capturing device, e.g., an image-capturing device 910, such as a camera (e.g., a CID camera) or a scanner, to capture a data-bearing medium, e.g., an image of a data-bearing medium. The image-capturing device 910 may convert the captured image into digital image data (e.g., a bitmap, PDF, TIFF, JPEG, etc.), for example. In an example, a captured area of the data-bearing-media capturing device may be the size of the region 110 in FIG. 1. In one implementation, the capturing device 910 may capture (e.g., detect) data-bearing elements on atomic data-bearing media, magnetic data-bearing media, optical data-bearing media, etc.

In an example, the system 900 may include an illumination source, such as a light source 915, to illuminate a data-bearing medium prior to reading the data-bearing medium. For example, the light source 915 may illuminate a portion of a data-bearing medium, such as the region 110.

The system 900 may include a controller 920 (e.g., a decoder) that may allow the system 900 to perform the methods and functions disclosed herein for recovering data, such as a payload, from a data-bearing medium, e.g., from a portion of the data bearing image. The functionality of the image-capturing device 910 that converts the captured image of a data-bearing medium into digital image data, representing the data-bearing medium may be incorporated in the controller 920.

The controller 920 may include a processor 922 for processing machine-readable instructions, such as processor-readable (e.g., computer-readable) instructions. The machine-readable instructions may instruct the processor 922 to allow the controller 920 to allow the system 900 to perform the methods and functions disclosed herein associated with recovering a payload from a data-bearing medium, e.g., from a portion a data-bearing medium. For example, the machine-readable instructions may instruct the controller 920 to allow the system 900 to perform the methods and functions associated with recovering the payload of a data-bearing medium, e.g., from a captured region of the data-bearing medium that may be a portion of the data-bearing medium without reading the entire data-bearing medium.

The machine-readable instructions may be stored in a memory 924 coupled to the processor 922, such as a non-transitory computer-usable medium, and may be in the form of software, firmware, hardware, or a combination thereof. In a hardware solution, the machine-readable instructions may be hard coded as part of the processor 922, e.g., an application-specific integrated circuit (ASIC) chip. In a software or firmware solution, the instructions may be stored for retrieval by the processor 922.

The controller 920 may include a storage device 926, such as a hard drive, removable flash memory, etc. The storage device 926 may store decryption keys, such as PKI (Public Key Infrastructure) and IBE (Identity Based Encryption) decryption keys, to respectively decrypt data decoded from a data-bearing medium. For example, the controller 920 may decrypt a recovered payload that may be encrypted.

A human-machine interface 930 may be coupled to the controller 920. The interface 930 may interface with a number of input devices, such as a keyboard and/or pointing device, including, for example, a mouse. The interface 930 may interface with a display 935 that may include a touchscreen that may function as an input device. The controller 920 may be coupled to a data network, such as the Internet, a Local Area Network (LAN), etc., and/or a computer via an interface 940.

It should be recognized that the functionality of the various block components described with reference to FIG. 9 may not necessarily be segregated to distinct components or component portions of a data-recovery system. For example, a single component or component portion of a data-recovery system could be adapted to perform the functionality of more than one block component of FIG. 9. Alternatively, one or more components or component portions of a data-recovery system could be combined to perform the functionality of a single block component of FIG. 9.

The processor 922, memory 924, storage device 926, and/or human-machine interface 930 may be implemented in a computer, for example, and the capturing device (e.g., image-capturing device 910) may be coupled to the computer, for example.

Figure 10:
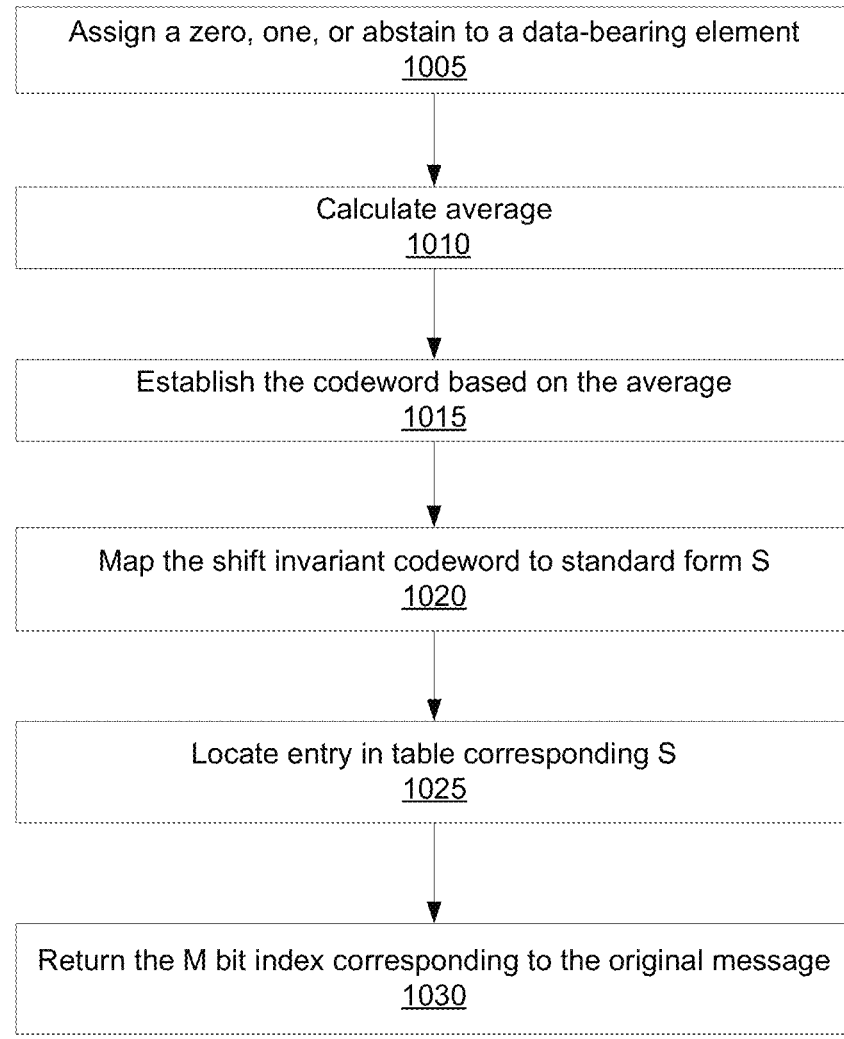
FIG. 10 illustrates a flowchart of an example of a method for recovering data from a data-bearing medium.

Turning now to the operation of data-recovery system 900, FIG. 10 illustrates an example process flow diagram 1000 in accordance with an implementation. The process 1000 depicts an example of the data-recovery system 900 that may find an M-bit message in data-bearing media, such as the data-bearing medium 100. The machine-readable instructions may configure the processor 922 to allow the controller 920 to allow data-recovery, to allow the system 900 to perform the process 1000 of automatically recovering a payload from a data-bearing medium, such as data-bearing medium 100 in FIG. 1, as illustrated by the flowchart in FIG. 10, for example. The data-recovery system 900 may perform the process 1000 in response to capturing (e.g., an image of) at least region 110 of data-bearing medium 100.

In one implementation, B, the number of bits in the codeword, may be an input to the system 900 by the data-bearing-medium-generation system 700 and stored in the storage 926. In addition or alternatively, the row-to-row offsets may be input to the system 900 by the data-bearing-medium-generation system 700 and stored in the storage 926. The controller 920 may know a priori that an image is a data-bearing medium having a circular code. This information may be input to system 900 by a user. Alternatively, the system 900 may be dedicated to handling data-bearing media having circular code, for example. In addition, the controller 920 may ask to know the orientation of the image (e.g., the direction of top, bottom and/or sides). For example, the image may be oriented in a certain way relative to the system 900. For example, the system 900 may instruct the user to orient the image or the system 900, e.g., via the display 935, a label fixed to system 900, or other means.

In one implementation, the decoder may have knowledge of the codeword length and inter-row shift relationships. In another implementation, the codeword length and inter-row shift relationships can be estimated if the desired redundancy R is sufficiently high. In a further implementation, the codeword length and/or per-row shift relationships may be achieved via correlative analysis of the rows in the capture window.

The process 1000 may begin at block 1005, where the controller 920 may receive instructions to initiate the process to recover data-bearing elements in the data-bearing medium into an array of bits corresponding to the portion of the data-bearing medium. In particular, this process may involve assigning a zero, one, or abstain to a data-bearing element. In one implementation, the controller 920 may assign an abstain label to any data-bearing element that is degraded due to damage, noise, or otherwise un-decodable. Alternatively or in addition, the controller 920 may exclude the data-bearing elements that are assigned abstain.

For example, a candidate shift may be tested, and thirteen samples of codeword symbol representing a bit value of one may be recovered in the presence of noise. In this example seven symbols may be determined by the recovery system to be relatively noise-free and may be assigned the value one. The remaining six symbols may be degraded by noise resulting in recovery values zero for four of the symbols and one for two of the symbols. Without using abstentions, the average recovery value for this bit may be $9/13 \approx 0.69$, whereas if the recovery system assigns abstentions to the six noisy symbols and excludes the noisy symbols, the resulting average may be 7/7=1.00.

At block 1010, an average of all non-abstained values may be calculated for each bit position $\{b_{B-1}, \ldots, b_1, b_0\}$. At block 1015, the codeword P is established. In particular, this process may involve determining whether the average is less than 0.5. If the average value is less than 0.5, a value of zero may be assigned, and if the average value is greater than or equal to 0.5, a value of one may be assigned. In one implementation, a bit's uncertainty may range from 0 to 0.5. In another implementation, the confidence levels may be multiplied by 100 to be expressed as percentages.

At block 1020, the shift-invariant codeword P may be mapped to standard form S. At block 1025, the entry in the encoding lookup table corresponding to the standard form is located, and at block 1030, the M-bit index, which corresponds to the original message, is returned.

Figure 11:
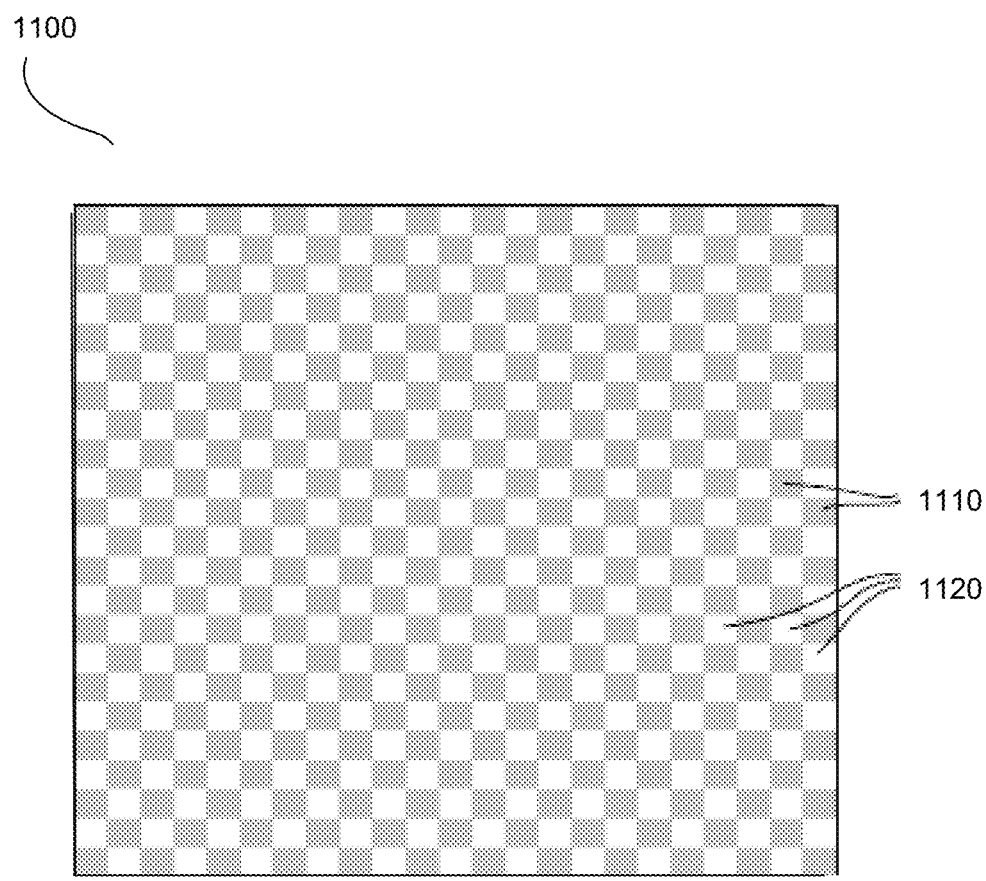
FIG. 11 illustrates an example of a cropped region of an encoded data-bearing halftone image.

FIG. 11 illustrates a cropped region 1100 that represents a captured portion of an encoded data-bearing halftone image. For example, the region 1100 may correspond to the region 110 in FIG. 1 and may be a portion of data-bearing medium 100. The region 1100 may include highlight modules (e.g., highlight cells) 1110 and shadow cells 1120. For example, each cell in the region 1100 may correspond to a data-bearing element, such as a data-bearing symbol, e.g., that may encode one bit. For example, the region 1100 may be L=23 symbols long and W=23 symbols wide.

In light portions of a data-bearing halftone image, the shadow cells 1120 may be completely white and thus unable to carry any data, while the highlight cells 1110 may be rendered as small black clusters capable of carrying data by means of shifting, for example. In dark areas of a data-bearing halftone image, the highlight cells 1110 may completely black and unable to carry any data, while the shadow cells 1120 may be rendered as small white clusters that can carry data, for example.

Figure 12:
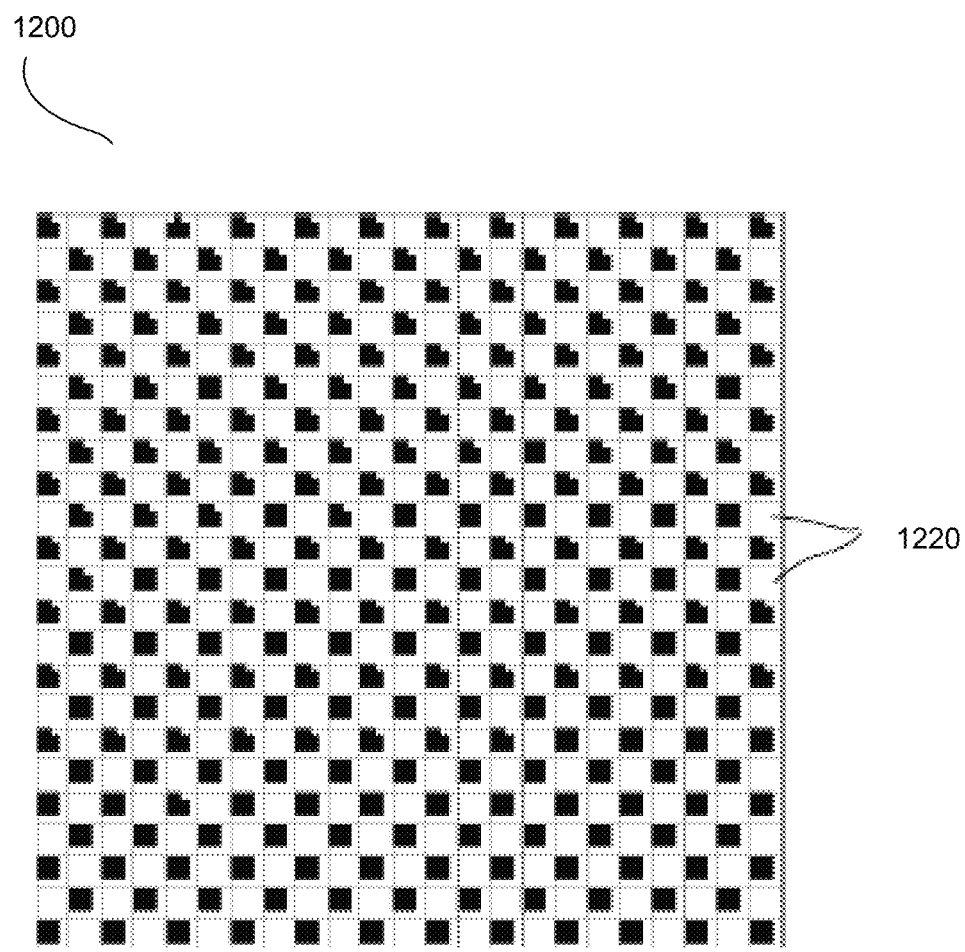
FIG. 12 illustrates an example of a cropped region cropped from an all highlight portion of a data-bearing halftone image.

Using the halftone cell pattern in the example of FIG. 11, an all highlight region 1200 may be captured from an all highlight portion of a data-bearing halftone image, as shown in the example of FIG. 12, where the boundaries of the halftone cells are superimposed. For example, each of the shadow cells 1220 may be all white and thus incapable of carrying data.

Figure 13:
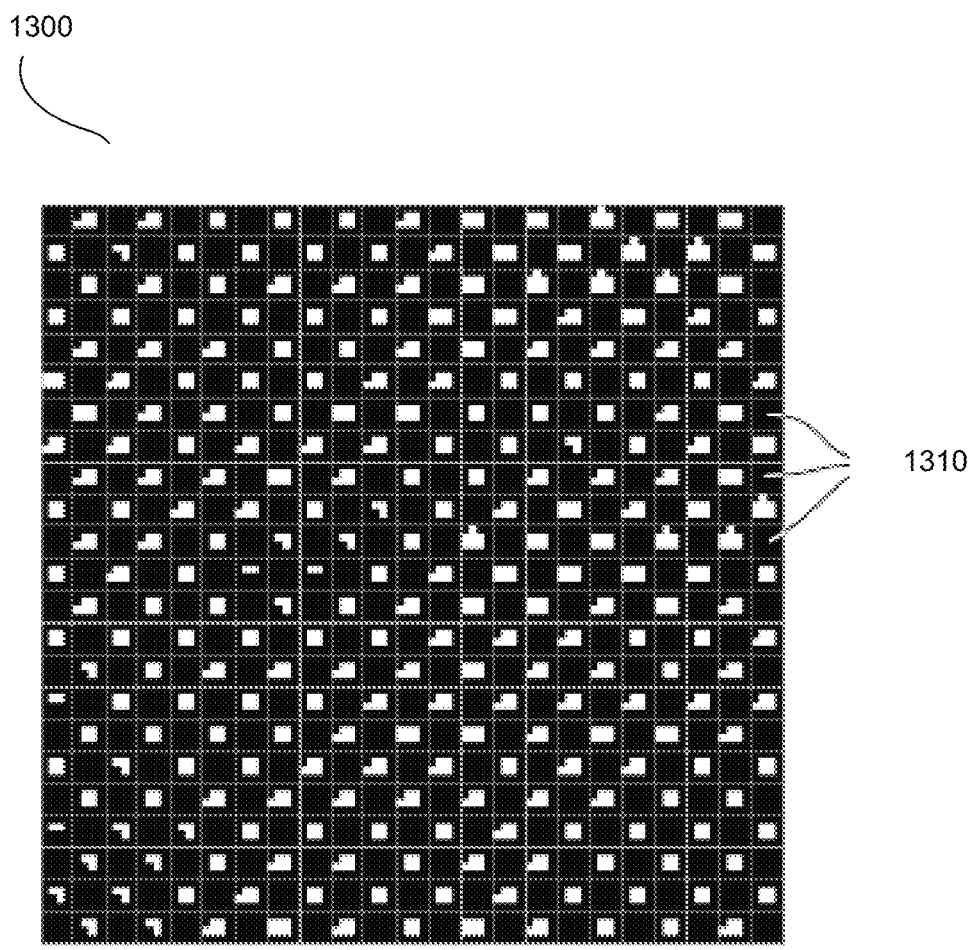
FIG. 13 illustrates an example of a cropped region cropped from an all shadow portion of a data-bearing halftone image.

Using the halftone cell pattern in the example of FIG. 11, an all shadow region 1300 may be captured from an all shadow portion of a data-bearing halftone image, as shown in the example of FIG. 13, where the boundaries of the halftone cells are superimposed. For example, each cell highlight cell 1310 may be all black and unable to carry data.

Figure 14:
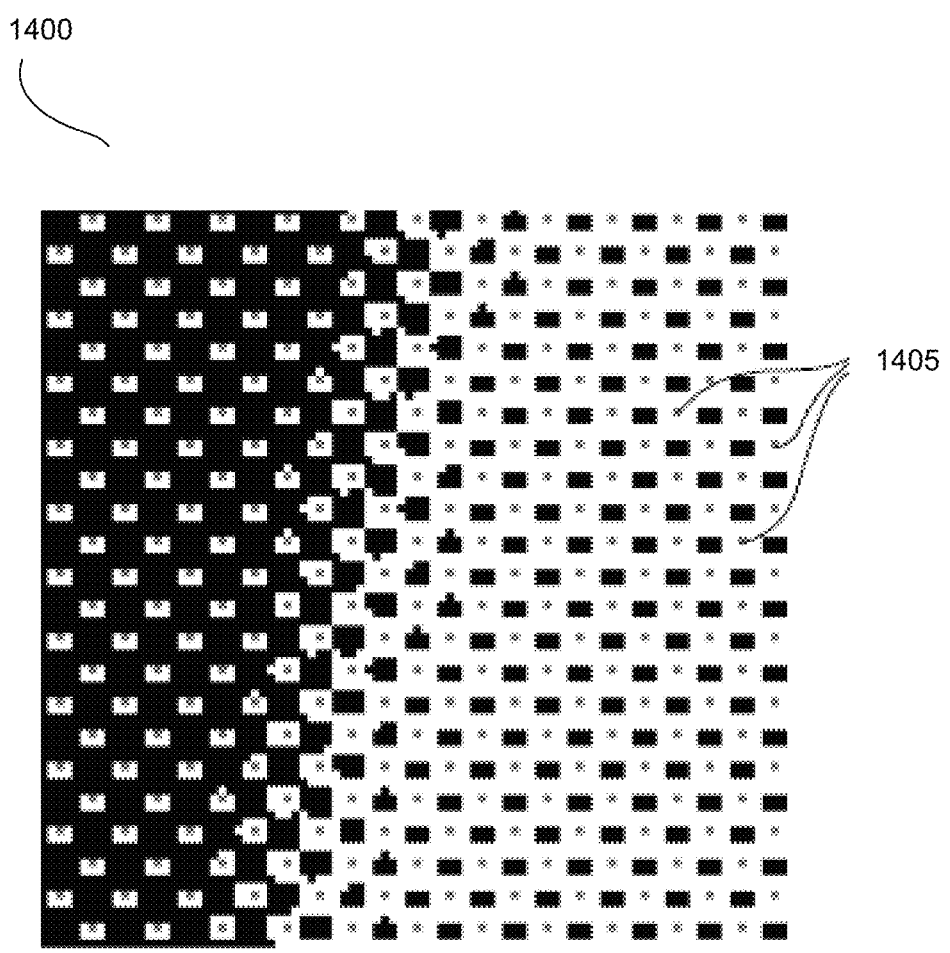
FIG. 14 illustrates an example of a cropped region cropped from a portion of a data-bearing halftone image where both highlights and shadows occur.

It is also possible to capture a region 1400 from a portion of a data-bearing halftone image where both highlights and shadows occur, as in the example of FIG. 14. For example, in FIG. 14, instead of superimposing the cell boundaries a dot 1405 is shown in each of the shadow cells to show where cells are data bearing (e.g., small white clusters) and non-data bearing (e.g., solid white cells). For example, FIG. 14 demonstrates that one cannot rely on a checkerboard pattern to locate potential data bearing cells.

The present disclosure has been shown and described with reference to the foregoing exemplary implementations. Although specific examples have been illustrated and described herein, it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A method comprising:
    setting, by a computing device, a bit length of a phase-invariant codeword;
    determining, by the computing device, the phase-invariant codeword by mapping a message to be represented by the phase-invariant codeword to the phase-invariant codeword based on the variables;
    repeatedly filling rows of a two-dimensional array with the phase-invariant codeword, by the computing device, each row containing circularly shifted versions of a repeated version of the phase-invariant codeword; and
    causing, by the computing device, the rows of the two-dimensional array to be printed on a data-bearing medium.

2. The method of claim 1, wherein determining the phase-invariant codeword comprises using a value of the message as an index into a lookup table to retrieve the phase-invariant codeword.

3. The method of claim 1, wherein determining the phase-invariant codeword further comprises performing an exhaustive iterative computation.

4. The method of claim 1, wherein the phase-invariant codeword comprises a natural number from a range of 1, $2^M$ as a sequence of bits, wherein M is the bit length of the message that the phase-invariant codeword represents.

5. The method of claim 4, wherein circular shifts of a given sequence map to the message.

6. The method of claim 1, wherein arranging the rows of the data-bearing medium further comprises arranging a two-dimensional array of bits.

7. The method of claim 6, wherein positions of the bits in each row of the two-dimensional array of bits are circularly shifted from positions of the bits in an immediately preceding row by a per-row offset.

8. The method of claim 7, wherein the per-row offset is fixed.

9. The method of claim 1, wherein the data-bearing elements comprise halftone clusters that are shifted in a certain way to encode their respective bits.

10. A computing system comprising:
    a processor to:
        set a bit length of a phase-invariant codeword;
        identify the phase-invariant codeword by mapping a message to be represented by the phase-invariant codeword to the phase-invariant codeword;
        repeatedly fill rows of a two-dimensional array with the phase-invariant codeword, by the computing device, each row containing circularly shifted versions of a repeated version of the phase-invariant codeword; and
        print the rows of the two-dimensional array on the data bearing medium.

11. The computing system of claim 10, wherein determining the phase-invariant codeword comprises using a value of the message as an index into a lookup table to retrieve the phase-invariant codeword.

12. The computing system of claim 10, wherein determining the phase-invariant codeword further comprises performing an exhaustive iterative computation.

13. The computing system of claim 10, wherein the phase-invariant codeword comprises a natural number from a range of 1, $2^M$ as a sequence of bits, wherein M is the bit length of the message that the phase-invariant codeword represents.

14. The computing system of claim 13, wherein circular shifts of a given sequence map to the message.

15. The computing system of claim 10, wherein the data bearing medium comprises an image.

16. The computing system of claim 10, further comprising at least one of a display and a printer to output the data bearing medium.

17. The method of claim 1, wherein a plurality of bits of each row of the two-dimensional array of bits having the rows are circularly shifted from a plurality of bits of an immediately preceding row of the two-dimensional array.

18. The method of claim 1, wherein the phase-invariant codeword has a bit length of B that is a prime number, the message has a bit length of M, and wherein M is equal to B minus a base two logarithm of B.

19. A non-transitory computer-readable data storage medium storing instructions executable by a processor to:
   setting a bit length of a phase-invariant codeword;
   determining the phase-invariant codeword by mapping a message to be represented by the phase-invariant codeword to the phase-invariant codeword;
   repeatedly filling rows of a two-dimensional array with the phase-invariant codeword, by the computing device, each row containing circularly shifted versions of a repeated version of the phase-invariant codeword; and
   causing, by the computing device, the rows of the two-dimensional array to be printed on a data-bearing medium.

* * * * *

UNITED STATES PATENT AND TRADEMARK OFFICE
CERTIFICATE OF CORRECTION

| | |
|---|---|
| PATENT NO. | : 9,984,318 B2 |
| APPLICATION NO. | : 14/917547 |
| DATED | : May 29, 2018 |
| INVENTOR(S) | : Matthew D Gaubatz et al. |

Page 1 of 1

It is certified that error appears in the above-identified patent and that said Letters Patent is hereby corrected as shown below:

In the Claims

In Column 12, Line 12, Claim 1, delete "codeword based on the variables;" and insert -- codeword; --, therefor.

Signed and Sealed this
Sixteenth Day of October, 2018

Andrei Iancu
*Director of the United States Patent and Trademark Office*